July 8, 1958     A. T. ZAHORSKI     2,841,850
FASTENING DEVICE
Filed July 26, 1954     2 Sheets-Sheet 1
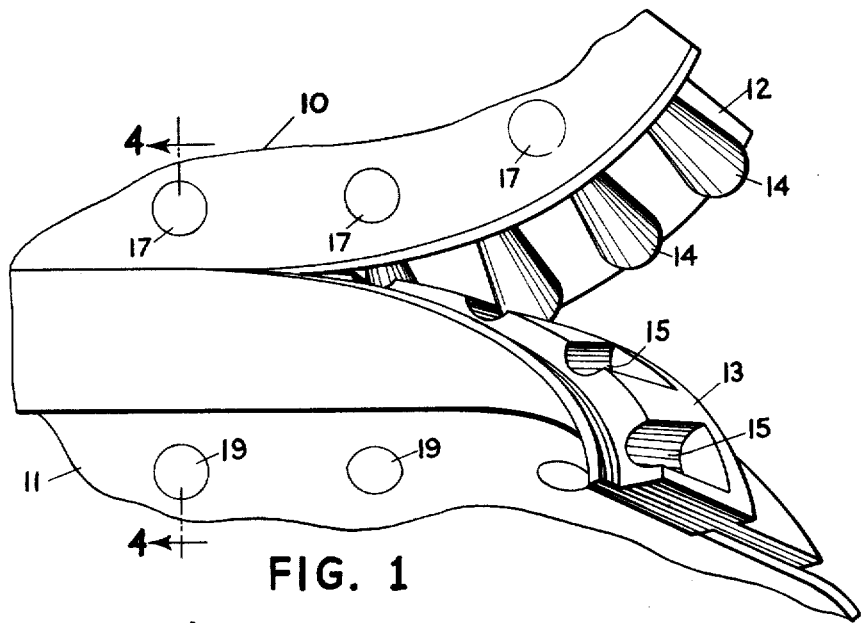
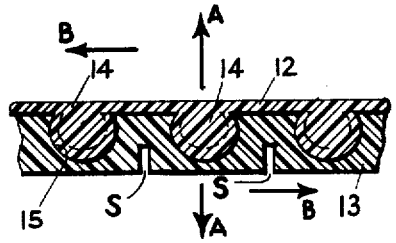
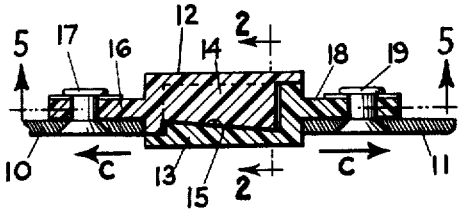
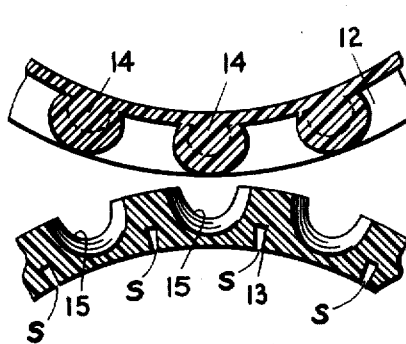
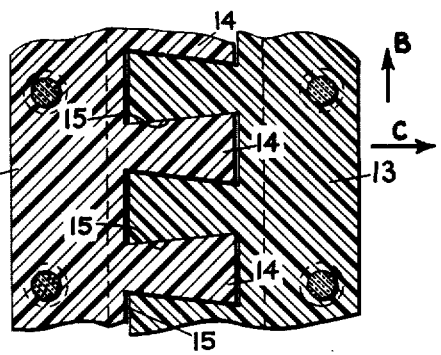
INVENTOR.
ADAM T. ZAHORSKI
BY *Ralph B. Pastoriza*
ATTORNEY July 8, 1958 — A. T. ZAHORSKI — 2,841,850
FASTENING DEVICE
Filed July 26, 1954 — 2 Sheets—Sheet 2

INVENTOR.
ADAM T. ZAHORSKI
BY Ralph B. Pastoriza
ATTORNEY

United States Patent Office 2,841,850
Patented July 8, 1958

2,841,850

FASTENING DEVICE

Adam T. Zahorski, Altadena, Calif., assignor to Aerophysics Development Corporation, a corporation of California Application July 26, 1954, Serial No. 445,657

3 Claims. (Cl. 24—204)

This invention relates to an improved zipper type fastening device for securing together the edges of covering material such as aluminum, plastic, or fiber glass sheets.

In the field of structures, there are many instances in which a basic frame net work is provided with a covering material. In aircraft fuselage structures, for example, a streamlined covering of light, strong, relatively flexible material is generally required. Preferably, this "skin" is of a light weight metal, plastic, or fiber glass material. It is desireable in certain instances to design such coverings so that they may be easily removed to permit inspection and maintenance of the fuselage frame within, and subsequently replaced with equal facility. In other instances, certain structures may be housed or covered by a suitable protective material for temporary storage.

For the above applications, as well as many others, the primary problem is that of securing the adjacent edges of the wrapping material together in a temporary manner to form a strong and reliable fastening. Since the structure coverings of the type under consideration are usually subjected to forces acting in all planes, it is of paramount importance that the fastening means be able to hold the adjacent edges of the material against shear, normal, and transverse forces.

Aside from the above important feature, the fastening means should be as simple in construction as possible and preferably form an integral part of the material itself. Further, it should be manually operable and not require the use of special tools or foreign parts such as sliders and the like. In aircraft fuselage applications, the fastening should be substantially fluid tight and invisible to avoid irregularities in the air flow surfaces.

The primary objects of the present invention are to provide an improved zipper type fastening means which will meet the above conditions.

Briefly, the invention contemplates a pair of strip members formed as a part of the longitudinal edges of the covering material or, if necessary, as separate pieces secured to these edges. The arrangement is such that the strips longitudinally overlap so that the inner face of one strip is in surface engagement with the outer face of the other, and the front edge of the one strip face is juxtaposed to the rear edge of the other strip face. One of the strip faces is provided with a row of projections spaced along its length dimension, each projection extending substantially across the width of the strip. The other strip face is provided with a row of recesses correspondingly spaced along the length dimension of the strip and shaped to receive the projections in mating engagement. The particular shape of the projections and recesses is such that when they are in mating relationship, the edges of the material are securely held against separating forces acting in shear, normal, and transverse directions.

A preferred shape for the projections and recesses is conical with the circumferential extent exceeding 180 degrees. With this arrangement, and the cone shaped projections nestled in the corresponding recesses, the strips are held against separation forces acting in a direction normal to the strip faces. By arranging the larger dimensioned base portions of the cone projections adjacent the front edge of one of the strips, and the smaller dimensioned portions of the conical recesses adjacent the front edge of the other of the strips, the inter-engagement of the projections and recesses, prevents transverse and shear forces acting in the plane of the strip faces from separating the material. Actual fastening or unfastening of the zipper is accomplished in one embodiment by transverse bending or flexing of the strips in a plane parallel to the longitudinal dimensions of the strips and normal to the strip faces, so that the entrance portions of the recess openings are stretched apart a sufficient distance to receive or release the projections. In a modification of the invention removal of a locking strip and application of a transverse compression force will enable one strip to be lifted from the other without any bending.

A better understanding of the invention will be had by referring to the accompanying drawings, in which:

Fig. 1 is an enlarged perspective view of a portion of one embodiment of the zipper type fastening device of the present invention;

Fig. 2 is a cross section of the fastening device in closed position;

Fig. 3 is a view similar to Fig. 2 illustrating the manner of opening or closing the structure;

Fig. 4 is an elevational cross section taken in the direction of the arrows 4—4 of Fig. 1;

Fig. 5 is a plan cross section taken in the direction of the arrows 5—5 of Fig. 4;

Figures 6, 8:
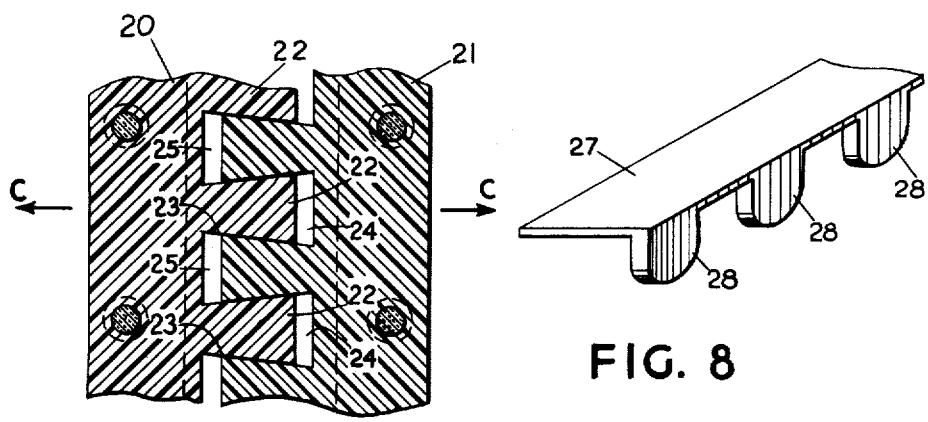
Fig. 6 is a plan cross section similar to Fig. 5 but showing a modified type of zipper.
Fig. 8 is a perspective view of a locking strip for use with the zipper of Figs. 6 and 7; and, Fig. 9 is an elevational cross section similar to Fig. 4 of the modified zipper with the locking strip in position.

Referring to Fig. 1 there is shown a portion of a covering material which may be used as an aircraft fuselage "skin," temporary wrapping, or any type of enclosing means. The material itself is preferably of an elastic, plastic type composition, such as fiber glass. Irrespective of the particular nature of the material, in the wrapping or covering operation, there will be adjacent edges of the material such as shown at 10 and 11 that must be secured together. In accordance with the present invention, a suitable fastening device for this purpose includes a pair of strip like members 12 and 13 fixed to the edges 10 and 11 respectively. If the nature of the wrapping material permits, the strips 12 and 13 may constitute integral portions thereof; alternatively, the strips may be formed of flexible plastic type material permanently secured to the material edges. In either event, the strips are substantially co-planar with the edge portions of the material so that they may assume a longitudinal overlapping relationship as shown in Fig. 1. With this arrangement, one of the strip faces, such as the strip face 12, will be in surface engagement with the other strip face 13.

In the particular embodiment shown in Fig. 1, the strip face 12 is provided with a row of projections 14 spaced along the longitudinal or length dimension of the strip. The strip face 13, on the other hand, is provided with a row of recesses 15 similarly spaced along the length dimension of the strip in opposed corresponding relationship with respect to the projections 14. The recesses 15 are shaped to hold the projections when the projections and rescesses are in mating relationship.

In the preferred embodiment shown in the drawings, the projections 14 and recesses 15 are conically shaped with the cone axes extending across the width of the strip faces. The circumferential extent of the projections and recesses exceeds 180 degrees so that the projections initially increase in size in a direction normal to the strip face and the recesses correspondingly initially increase in size interiorly. With this arrangement and the projections 14 and recesses 15 in mating relationship as shown in Fig. 2, the edges of the material are securely held against separating forces represented by the arrows A, A acting in a plane normal to the strip faces and adjacent material. It will be equally clear that the material edges are also securely held against shear forces such as represented by the arrows B, B in Figs. 2 and 5.

The interlocking feature of the respective projections and recesses described above is realized so long as the strips follow like directions and the strip faces are in substantial face to face relationship. If, however, the strip 13, containing the recesses, is transversely flexed or bent in a plane normal to the faces as indicated in Fig. 3, the recess openings will be widened sufficiently to release the projections 14. If the bend or flexing is in the other direction such as to correspond to the bending of the strip 12 of Fig. 3, the recesses will grip the projections more tightly. For this reason, it is preferable that the projections be provided on the underlying or inner longitudinal strip and the recesses on the overlying or outer longitudinal strip, since the outer surface of the covering material, in enclosing a fuselage or other structure, would normally assume convex configurations rather than concave. This preferred positioning of the projections and recesses is shown in Fig. 1 in which strip 12 represents the inner or underlying strip and strip 13 the overlying or outer strip.

It will be clear from the above characteristics, that the zipper structure of Figs. 1 to 5 may be opened by simply flexing the outer end portion of the recessed strip into a concave configuration thereby widening the first recess opening sufficiently to release the first corresponding projection. Further peeling back of the outer strip will permit releasing of the subsequent projections in a sequential manner, the condition for the release of any one projection being that the immediately preceding projection be released. The zipper structure is closed in a reverse manner by sequentially pressing the recesses onto the projections, starting with an initially concave flexed configuration; the operation may be manually performed and no slider or special tools are required.

To facilitate the bending of the strip it is possible to provide small slots or cuts in the strip 13 extending inwardly from the outer surface between the recesses as shown at S. These slots will accommodate the compression of the lower outer strip face as shown.

Referring now to Figs. 4 and 5, it will be noted that the larger base ends of the cone like projections 14 are adjacent the front edge of the strip 12 so that the projections decrease in size in a direction extending from the front edge of the strip face, across the width of the face, to the rear edge of the strip face. The recesses 15 in the strip 13, increase in size from the front edge, across the width of the strip face, to the rear edge of the strip face. Accordingly, when the projections and recesses are in mating relationship, the edges of the material are held against transverse separating forces acting in the plane of the strip faces as indicated by the arrows C—C in Figs. 4 and 5. In fact, the conical shape of the projections and recesses provides a wedging effect so that the greater the separating forces, the tighter will the projections and recesses be engaged. This feature is particularly important when the material is employed as a skin covering for pre-stressed fuselage structures, since the expansion forces of the structure on the material will tend to tightly stretch the covering, resulting in relatively large forces acting in the plane of the strips transverse to the fastening seam.

In the embodiment shown in the drawings, the strips 12 and 13 constitute separate pieces secured to the edges 10 and 11 of the covering material. Referring particularly to Fig. 4, it will be noted that the rear edge portion of the strip 12 is provided with a longitudinal flange 16 overlapping the edge 10 of the material and secured thereto by a suitable fastener 17. Similarly, the rear edge portion of the strip 13 is provided with a longitudinal flange 18 overlapping the edge 11 of the material and secured thereto by a suitable fastener 19. As shown in Fig. 1, the fasteners 17 and 19 are evenly distributed on either side of the seam throughout its length.

In Fig. 4, the flanges 16 and 18 lie in a plane including the axis of the cone projections. With this arrangement, forces tending to separate the edges of the material, as indicated by the arrows C—C, will be directed along the axes of the cones and recesses in a single plane thereby preventing the formation of any twisting moments. The elimination of such moments depends mainly, however, on the fact that the flanges are coplanar and therefore, these flanges may be lowered or made thicker to bring the bottom surfaces of the material edges 10 and 11 as viewed in Fig. 4 flush with the bottom of the strip 13. Since, this bottom portion represents the outside of the covering material, there will then be presented a smooth streamlined seam with substantially no irregularities which might otherwise interfere with the air flow.

Referring now to Figs. 6 to 9, there is shown a modified type of zipper in which the strip members may be separated without the necessity of flexing or bending the strips.

As shown particularly in Fig. 6, the fastening device comprises a pair of strip members 20 and 21 provided with conical type projections 22 and corresponding recesses 23 similar to the projections 14 and recesses 15 of Fig. 4. In the instant embodiment however, the projections 22 are shortened in the direction of their cone axes thereby leaving a small space 24 between the bottom or base of each cone and the end wall of each recess. Similarly, the portions of the strip 21 between the recesses 23 are shortened to leave a small space 25 between the front edge of the strip 21 and the rear edge of the strip 20.

As shown in Fig. 6, the strips are in locked position and transverse forces in the direction of the arrows C, C will tend to cause the recesses 23 to grip the projections 22 more tightly for the same reasons set forth in connection with the zipper of Figs. 1 to 4. In view of the small spaces 24 and 25 however, it will be observed that the strip members may be compressed together such that the cone projections and recesses will assume the relative positions shown in Fig. 7. This sliding of the projections further towards the end walls of the recesses in response to a compression force as indicated by the arrows D, D will leave gaps 26 between the lateral or side walls of the cone projections and the recesses. These gaps 26 result from the conical nature of the projections and recesses. Thus, the former spaces 24 and 25 are now filled, but there is no longer any tight gripping action of the recesses on the cones. In fact, the gaps 26 are sufficiently large to enable the strip 20 to be lifted vertically from the recessed strip 21 to release the cones from the recesses.

Figures 7, 9:
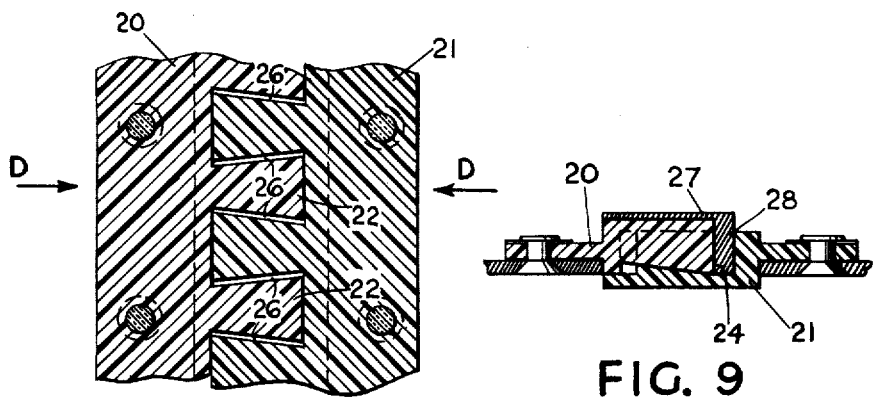
Fig. 7 is a view similar to Fig. 6 showing the zipper portions in position to be separated.

It will be seen from the above description that with the modified structure shown in Figs. 6 and 7, the zipper may be fastened by simply increasing the overlapping relationship of the strips and pressing the projections in the recesses, and then permitting the usual separating forces as indicated by the arrows C, C to pull the cones into tight engagement with the recesses. Unfastening of the zipper, as pointed out above, is simply effected by compressing the strips to increase their overlapping relationship as shown in Fig. 7, and then lifting one of the strips from the other. The gaps 26 formed by compressing the strips transversely towards each other are sufficient to permit the cone type projections to pass through the open tops of the recesses notwithstanding their circumferential extent is greater than 180 degrees.

In the event that the modified type of zipper shown in Figs. 6 and 7 is used to cover a structure in which compression forces may accidentally be applied to the strips thereby causing them to separate, a locking member may be employed to prevent movement of the projections further towards the end walls of the recesses. Referring particularly to Fig. 8, this locking member may take the form of an elongated strip 27 having a series of downwardly directed tabs 28 spaced along a longitudinal edge thereof. These tabs are spaced to correspond with the spacing of the various projections on the strip 20 and are sufficiently narrow to fit between the base ends of the projections and the end walls of the recesses when the zipper strips are in mating relationship.

As shown most clearly in Fig. 9, with the locking strip member 27 is position, the tabs 28 will fit in the spaces 24 thereby preventing any compression forces from moving the projections further towards the end walls of the recesses. When it is desired to unfasten the zipper, the locking member 27 is removed and suitable compression force then applied to the strips so that they assume the relative positions shown in Fig. 7 at which time they may be separated as described above.

While the invention has been described with reference to conically shaped projections and recesses, it will be understood that other shapes falling within the spirit of the invention will occur to those skilled in the art. The invention is therefore not to be thought of as limited to the particular embodiment chosen for illustrative purposes.

I claim:

1. A device for fastening together the adjacent edges of a material, comprising: a pair of strip members secured to said adjacent edges, respectively, in longitudinal overlapping relationship whereby the inner face of one of said strips is in surface engagement with the outer face of the other of said strips and the front edge of said one strip is juxtaposed to the rear edge of the other strip, said material initially extending from its adjacent edges in opposite directions away from said strips and insubstantially the same plane whereby stretching forces acting in said plane in directions transverse to the longitudinal edges of the material and strips tend to separate said material edges and slide the strip members from their overlapping relationship; one strip face having a row of projections spaced along its length dimension; the other strip face having a row of recesses spaced along its length dimension in corresponding relationship with respect to the row of projections; each of said projections decreasing in size in a direction extending from the front edge of said one strip face, across the width of the strip face, towards the rear edge of the strip face and also increasing in size in a direction extending normally away from said one strip face; the corresponding recesses in said other strip face each opening out on the front edge of the strip face and being defined by diverging side walls continuously extending across the width of the strip face, to terminate in an end wall adjacent to the rear edge of the strip face so that each recess increases in size interiorly, said recesses having a greater length in the width direction of the strip than the projections whereby when said projections are in tight mating engagement with said recesses, the edges of said material are held against said stretching forces and also against forces acting in directions normal to the strip faces and whereby there is left a small space between said end wall of each recess and the end of each projection equal to the difference in length between each recess and its mating projection so that the projections may be moved, by transverse compression forces applied to said strips, further towards the end walls of the recesses to leave gaps between the lateral sides of the projections and recesses, said gaps being of sufficient size to pass the projections and enable the strips to be separated.

2. A device according to claim 1, in which each of said projections is conically shaped and has its axis extending across the width of the strip between the front and rear edges thereof, the base portion of the conical shape being adjacent to the front edge of the strip and the corresponding recess having its interior also conically shaped, the circumferential distance about each projection and recess being greater than 180°.

3. A device according to claim 2, including, in combination, a locking member in the form of an elongated strip having a series of downwardly extending tabs spaced along a longitudinal edge of the member and dimensioned to fit within the space between the bases of said projections and said end walls of said recesses when said projections and said recesses are in tight mating engagement, whereby movement of said projections further towards said end walls of the recesses may be prevented.

References Cited in the file of this patent

UNITED STATES PATENTS

| 2,025,021 | Sipe | Dec. 17, 1935 |
| 2,035,674 | Sipe | Mar. 31, 1936 |
| 2,371,639 | Mason | Mar. 20, 1945 |
| 2,613,421 | Madsen | Oct. 14, 1952 |
| 2,629,911 | Macy | Mar. 3, 1953 |
| 2,772,469 | Staller | Dec. 4, 1956 |

FOREIGN PATENTS

| 1,067,224 | France | Jan. 27, 1954 |